United States Patent
Zhou et al.

(10) Patent No.: US 9,197,086 B2
(45) Date of Patent: Nov. 24, 2015

(54) BOOSTING INPUT POWER

(75) Inventors: Pei-Qi Zhou, Shanghai (CN); Wei Yan, Shanghai (CN)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 13/459,663

(22) Filed: Apr. 30, 2012

(65) Prior Publication Data

US 2013/0285596 A1 Oct. 31, 2013

(51) Int. Cl.
*H02J 7/00* (2006.01)
*H02J 3/32* (2006.01)

(52) U.S. Cl.
CPC .............. *H02J 7/0052* (2013.01); *H02J 7/0022* (2013.01); *B60L 2210/14* (2013.01); *H02J 3/32* (2013.01); *Y02T 90/127* (2013.01)

(58) Field of Classification Search
CPC ....... H02J 7/0022; H02J 3/32; B60L 2210/14; Y02T 90/127
USPC .......................... 320/107, 128, 140, 160, 162
See application file for complete search history.

(56) References Cited

U.S. PATENT DOCUMENTS

| | | | | |
|---|---|---|---|---|
| 5,731,685 | A * | 3/1998 | Jones | 320/150 |
| 6,507,173 | B1 * | 1/2003 | Spiridon et al. | 320/162 |
| 6,798,177 | B1 | 9/2004 | Liu et al. | |
| 7,176,665 | B2 | 2/2007 | Knoedgen et al. | |
| 7,380,146 | B2 * | 5/2008 | Swope | 713/320 |
| 7,528,574 | B1 * | 5/2009 | Adkins et al. | 320/128 |
| 7,622,898 | B2 * | 11/2009 | Shimizu et al. | 320/166 |
| 7,639,519 | B2 | 12/2009 | Ito | |
| 7,863,865 | B2 * | 1/2011 | Hussain et al. | 320/140 |
| 7,977,913 | B2 * | 7/2011 | Tan et al. | 320/112 |
| 7,990,106 | B2 * | 8/2011 | Hussain et al. | 320/128 |
| 8,217,626 | B2 * | 7/2012 | Winger et al. | 320/128 |
| 8,362,745 | B2 * | 1/2013 | Tinaphong | 320/108 |
| 8,493,029 | B2 * | 7/2013 | Winger et al. | 320/128 |
| 8,629,654 | B2 * | 1/2014 | Partovi et al. | 320/108 |
| 8,638,011 | B2 * | 1/2014 | Robinson et al. | 307/115 |
| 8,760,119 | B2 * | 6/2014 | Winger et al. | 320/128 |
| 8,764,242 | B2 * | 7/2014 | Recker et al. | 362/276 |
| 2006/0164038 | A1 * | 7/2006 | Demers et al. | 320/116 |
| 2008/0169705 | A1 * | 7/2008 | Tan et al. | 307/66 |
| 2008/0258688 | A1 * | 10/2008 | Hussain et al. | 320/145 |
| 2009/0121684 | A1 * | 5/2009 | Hussain et al. | 320/139 |
| 2009/0278506 | A1 * | 11/2009 | Winger et al. | 320/160 |
| 2011/0080143 | A1 | 4/2011 | Parakulam et al. | |
| 2011/0128153 | A1 * | 6/2011 | Sims et al. | 340/636.1 |
| 2011/0273132 | A1 * | 11/2011 | Khaitan et al. | 320/101 |
| 2012/0013175 | A1 * | 1/2012 | Newman et al. | 307/9.1 |
| 2013/0082662 | A1 * | 4/2013 | Carr et al. | 320/134 |
| 2013/0119927 | A1 * | 5/2013 | Partovi | 320/108 |
| 2013/0200841 | A1 * | 8/2013 | Farkas et al. | 320/107 |
| 2013/0278205 | A1 * | 10/2013 | Mullins et al. | 320/107 |
| 2013/0285605 | A1 * | 10/2013 | Partovi | 320/108 |
| 2014/0203763 | A1 * | 7/2014 | Zhao et al. | 320/107 |

* cited by examiner

Primary Examiner — Helen Rossoshek
(74) Attorney, Agent, or Firm — Turocy & Watson

(57) ABSTRACT

In one implementation, an input power management component receives an input power, and determines whether an input current and voltage satisfies predetermined thresholds. A boost component generates a boost output voltage using the input voltage if the input current satisfies a predetermined current threshold, and a step-down charging component converts the boost output voltage to a voltage for charging a battery and system power management.

15 Claims, 5 Drawing Sheets

BOOSTING INPUT POWER

BACKGROUND

Rechargeable lithium ion (Li-ion) batteries have become standard in portable computing devices, such as laptops, tablets, and smart phones. Consumers expect powerful mobile devices that can operate for extended periods of time from a battery source. Li-ion batteries have proven to be very effective for these applications.

In order to achieve the greatest user convenience, modern mobile devices should support five volt and universal serial bus (USB) charging. Such charging systems may use a boost circuit followed by a buck charging circuit, and are unable to sense a status of a five volt power rail for the USB. Instead, typical charging systems only sense the boost circuit high voltage power rail. Charging circuits that only sense the boost circuit high voltage power rail may have a low power utilization efficiency, because the charging circuit must account for multiple factors and tolerances to avoid damage from over current/over voltage inputs.

DETAILED DESCRIPTION

Figure 1:
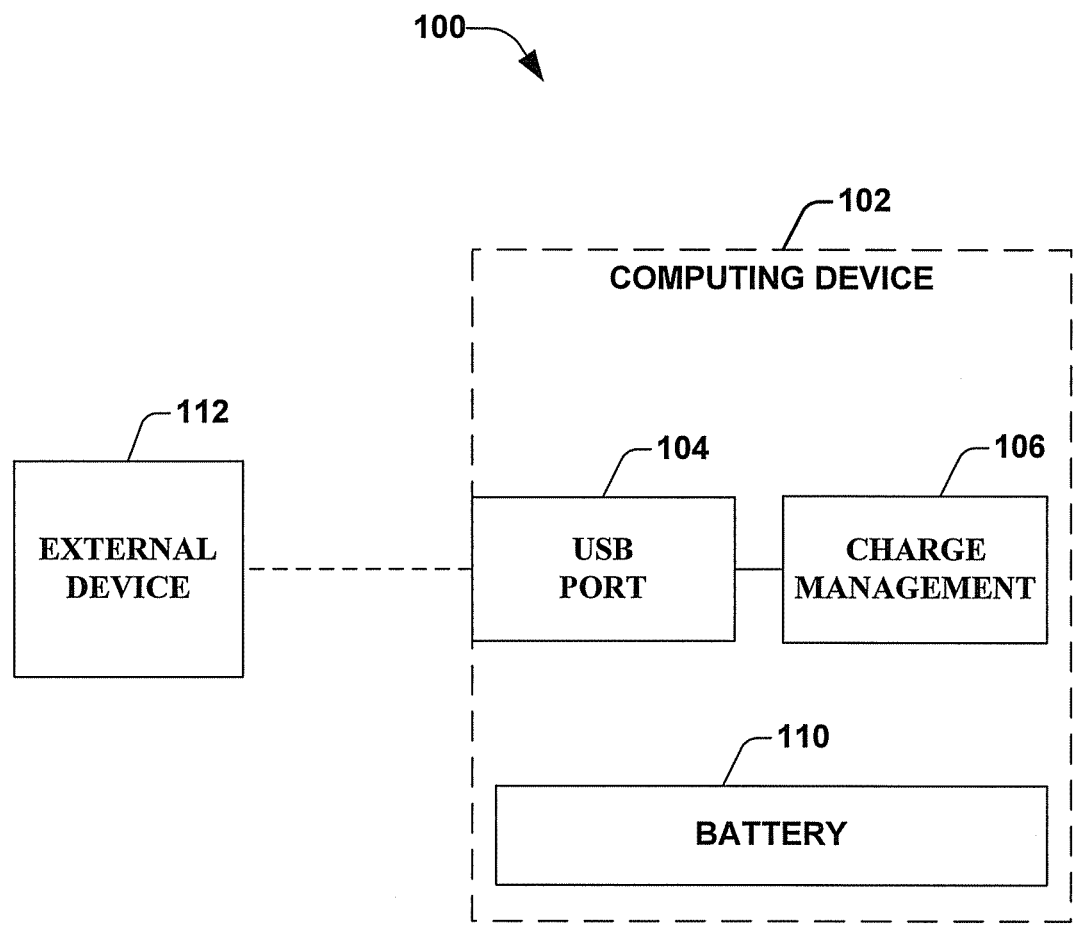
FIG. 1 illustrates an example high level block diagram of a boost charge system based on a discrete solution with direct input sensing in accordance with various aspects of embodiments disclosed.

One or more implementations of the present disclosure are described with reference to the attached drawings, wherein like reference numerals are used to refer to like elements throughout.

Referring now to FIG. 1, illustrated is an example high level block diagram of a boost charge system 100 based on a discrete solution with direct input sensing. The system 100 includes a computing device 102. The computing device 102 (device 102) can include but is not limited to a smart phone, a cell phone, a personal digital assistant (PDA), a tablet, a laptop, a desktop, a portable music player, a video game system, an electronic reader (e-reader), a global positioning system (GPS), a set-top box, and/or a television.

The device 102 includes a universal serial bus (USB) 104, a charge management component 106, and a battery 110. The USB 104 enables the device 102 to communicate, supply power to, and/or receive power from an external device 112. For example, the external device 112 can include a keyboard, pointing device, digital camera, printer, portable media player, disk drive, other computing device, and/or network adapter. As an additional or alternative example, the external device can include a battery charger that supplies power via the USB 104 to recharge the battery 110. In one implementation, the battery 110 can include but is not limited to a rechargeable lithium-ion (Li-ion) battery having, for example, two cells in series (2S) or three cells in series (3S).

The charge management component 106 controls, directs, or otherwise manages recharging the battery 110 via the USB 104. USB connections may operate on about five volts (5V), and the voltage required to charge the battery 110 can be, for example, from about 10V to about 24V. The charge management component 106 can increase (e.g., step-up) the voltage received from a battery charger via the USB 104 (e.g., about 5V) to the voltage required to charge the battery 110 (e.g., about 10V to 24V). In addition, the charge management component 106 provides over current/over voltage protection for the device 102 and/or battery 110. For example, a user of the device 102 may accidently connect an incorrect or faulty adapter to the USB 104 that could damage the device 102 and/or battery 110.

Figure 2:
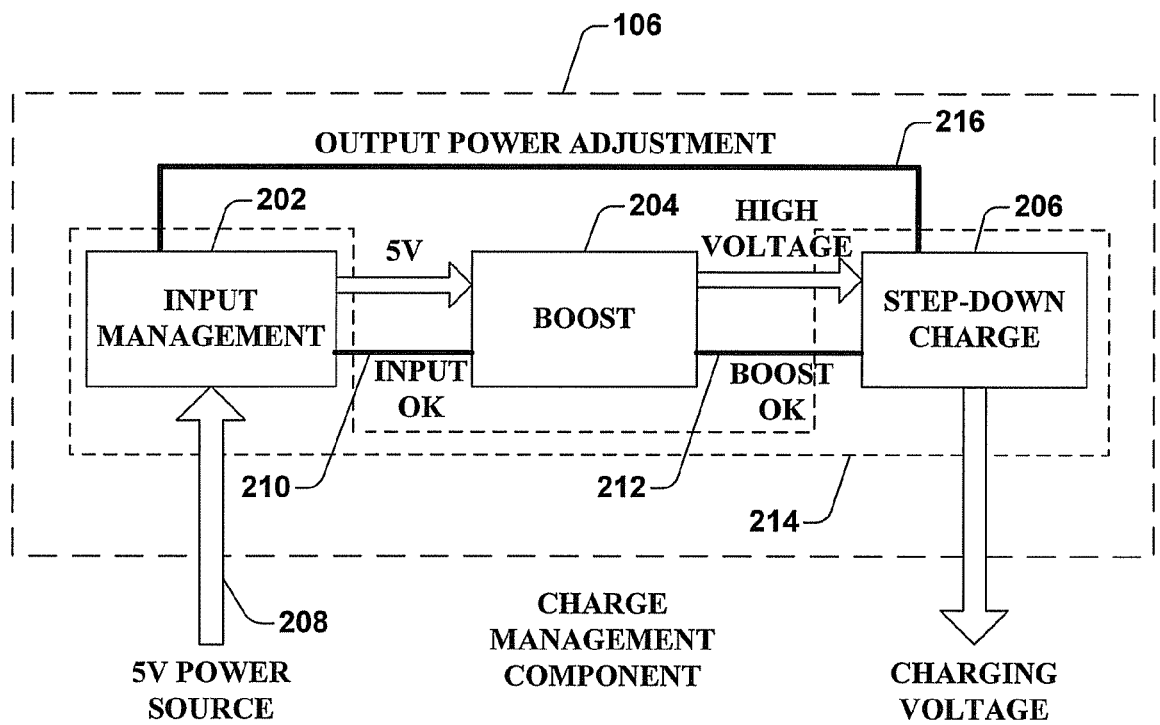
FIG. 2 illustrates an example charge management component in accordance with various embodiments that are disclosed.

FIG. 2 illustrates an example charge management component 106 in accordance with various embodiments that are disclosed. In one example configuration, the charge management component 106 comprises an input management component 202, a boost component 204 (e.g., boost circuit), and a step-down charge component 206. The input management component 202 obtains, acquires, or otherwise receives an input power from a power source 208. For example, in one configuration, the input management component 202 is adapted to receive about a five volt (5V) direct current (DC) power source via the USB 104.

The input power management component 202 senses an input current and an input voltage provided by the power source 208 (e.g., direct input sensing). The input power management component 202 determines whether the input current satisfies an input current threshold, and whether the input voltage satisfies an input voltage threshold. For example, in one configuration, the input management component 202 checks a status of the input current using an analog signal (e.g., a differential signal) containing a change in voltage (delta voltage) between a current-sensing positive input (CSIP) and a current-sensing negative input (CSIN), and instructs the step-down charge component 206 to adjust an output capability based on the status of the input current using an output power adjustment signal 216. For instance, if the input current is less than a lower limit, then step-down charge component 206 can increase the output capability based on the output power management signal 216. If the input voltage satisfies the input voltage threshold, then the input management component 202 sends, asserts, or makes active an INPUT OK signal 210 (e.g., boost enabled or BOOST_EN). For example, in one configuration, the INPUT OK signal 210 has a default low (e.g., 0), and when the input voltage satisfies the input voltage threshold, the input management component 202 makes the INPUT OK signal 210 high (e.g., 1). If the input voltage does not satisfy the input voltage threshold (e.g., over current), then the input signal 210 remains low. The input management component 202 protects the device 102 from an inappropriate (e.g., over current or over voltage) input power source 208.

The boost component 204 receives the input power (e.g., 5V) from the input management component 202. If the INPUT OK signal 210 is active (e.g., 1, true, etc.), then the boost component 204 increases, steps-up, or otherwise boosts the input voltage. For example, in one configuration, the boost component 204 includes a switching-mode power supply (SMPS). It is to be appreciated that Power=Voltage*Current (P=V*I). Therefore, the output of the boost component 204 will have a higher voltage (e.g., high voltage) and a lower current than the input power received from the input management component 202. In addition, the boost component 204 compares the boost output (e.g., high voltage) to a boost threshold. If the boost output satisfies the boost threshold, then the boost component 204 sends, asserts, or makes active a BOOST OK signal 212. For example, in one configuration, the BOOST OK signal 212 has a default low (e.g., 0), and the boost component 204 makes the BOOST OK signal 212 high (e.g., 1) when the boost output satisfies the boost threshold. If the boost output does not satisfy the boost threshold, then the BOOST OK signal 212 remains (or is made) low.

The step-down charge component 206 acquires, obtains, or otherwise receives the output from the boost component 204 (e.g., high voltage). If the BOOST OK signal 212 is active (e.g., 1, true, etc.), then the step-down charge component 206 decreases, reduces, or otherwise steps-down the boost output voltage. For example, in one configuration, the step-down charge component 206 includes a buck converter (e.g., SMPS) that converts the high voltage output of the boost component to a lower voltage required for charging a battery (e.g., about to 10V to 24V for a Li-ion battery). As discussed, P=V*I. Therefore, the output of the step-down charge component 206 will have a lower voltage (e.g., high voltage) and a higher current than the output of the boost component 204. The highest current appropriate for charging a Li-ion battery can be about 25% of the total capacity of the battery in amp hours.

Figure 3:
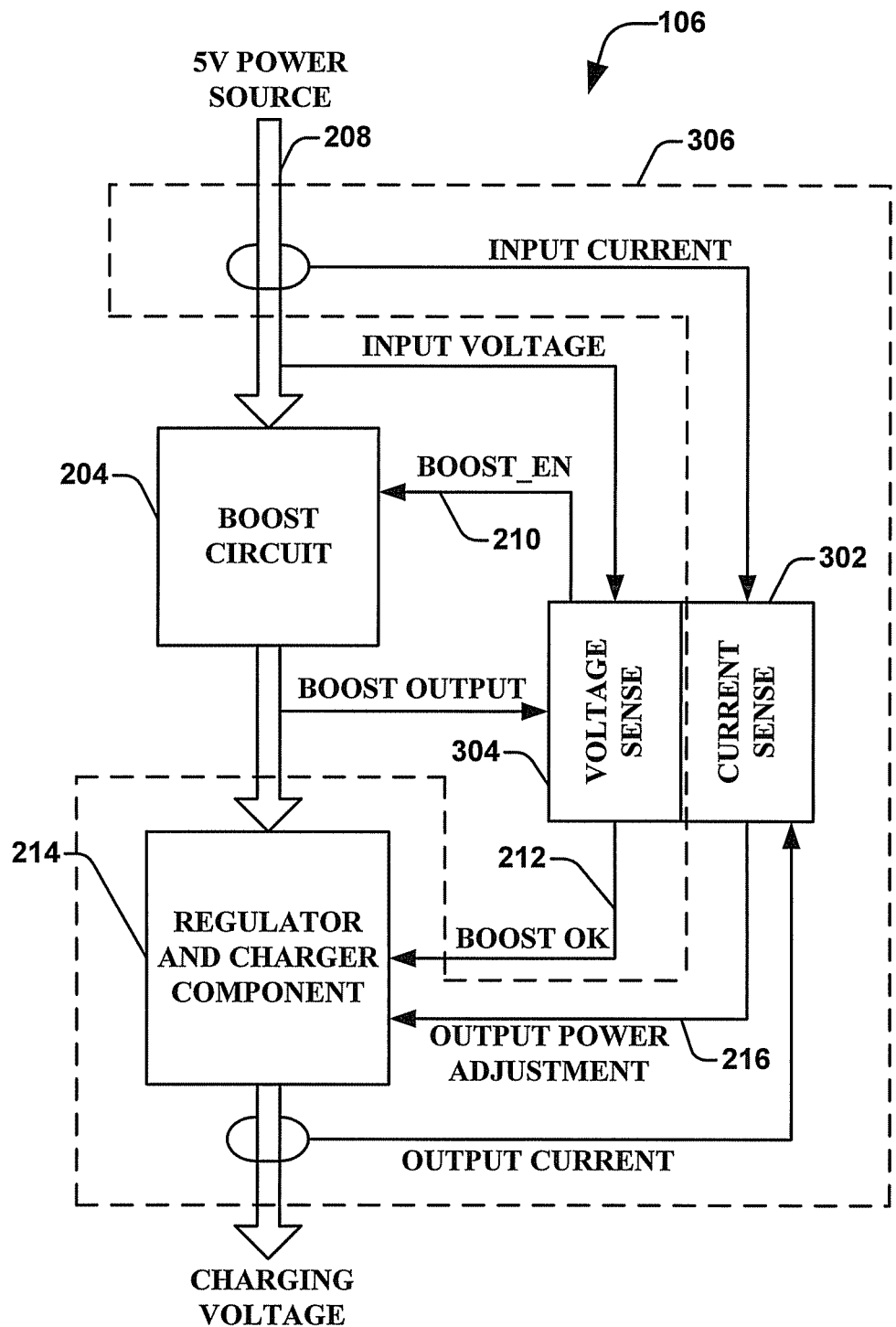
FIG. 3 illustrates an example charge management component in accordance with various embodiments that are disclosed.

FIG. 3 illustrates an example charge management component 106 in accordance with various embodiments that are disclosed. In one example configuration, the charge management component 106 includes a regulator and charger component 214, a boost component 204, a current sensing component 302, and a voltage sensing component 304. The regulator and charger component 214 includes the features of the input management component 202 and step-down charge component 206 (discussed in greater detail with reference to FIG. 2) into a single component. For example, in one configuration, the regulator and charger component 214 and current sensing component 302 can be implemented using an integrated circuit (IC) 306 (subsystem 306), such as an INTERSIL™ ISL9519Q Narrow VDC Regulator/Charger with system management bus (SMBus) Interface.

The subsystem 306 obtains, acquires, or otherwise receives an input power from a power source 208 (e.g., 5V DC), for example, via the USB 104. The current sensing component 302 senses an input current provided by the power source 208, and the voltage sensing component 304 senses an input voltage provided by the power source 208. If the input voltage satisfies an input voltage threshold, then the voltage sensing component 304 makes active a boost enable (BOOST_EN) signal 210 (e.g., INPUT OK). If the input voltage does not satisfy the input threshold (e.g., over voltage), then the BOOST_EN 210 remains (or is made) inactive. If the input current satisfies an input current threshold, then the current sensing component 302 instructs (e.g., using an analog output power adjustment signal) the regulator and charger component 214 to maintain a present output capability (e.g., using the output power adjustment signal 216). If the input current does not satisfy the input current threshold (e.g., over current or lower than threshold), then the current sensing component 302 instructs the regulator and charger component 214 to adjust the output capability. For instance, if the input current is less than a lower limit, then the regulator and charger component 214 can increase the output capability.

The boost component 204 receives the input power (e.g., 5V) from the power source 208. If the BOOST_EN signal 210 is active (e.g., 1, true, etc.), then the boost component 204 increases or boosts the input voltage. The voltage sensing component 304 compares the boost output (e.g., high voltage) to a boost threshold. If the boost output satisfies the boost threshold, then the voltage sensing component 304 makes active a BOOST OK signal 212. If the boost output does not satisfy the boost threshold, then the BOOST OK signal 212 remains (or is made) inactive.

The regulator and charger component 214 receives the boost output from the boost component 204 (e.g., high voltage). If the BOOST OK signal 212 is active (e.g., 1, true, etc.), then the regulator and charger component 214 generates a charging voltage by stepping-down the boost output voltage. As discussed, P=V*I. Therefore, the output (e.g., charging voltage) of the regulator and charger component 214 (e.g., charging voltage) will have a lower voltage (e.g., high voltage) and a higher current than the output of the boost component 204.

Figure 4:
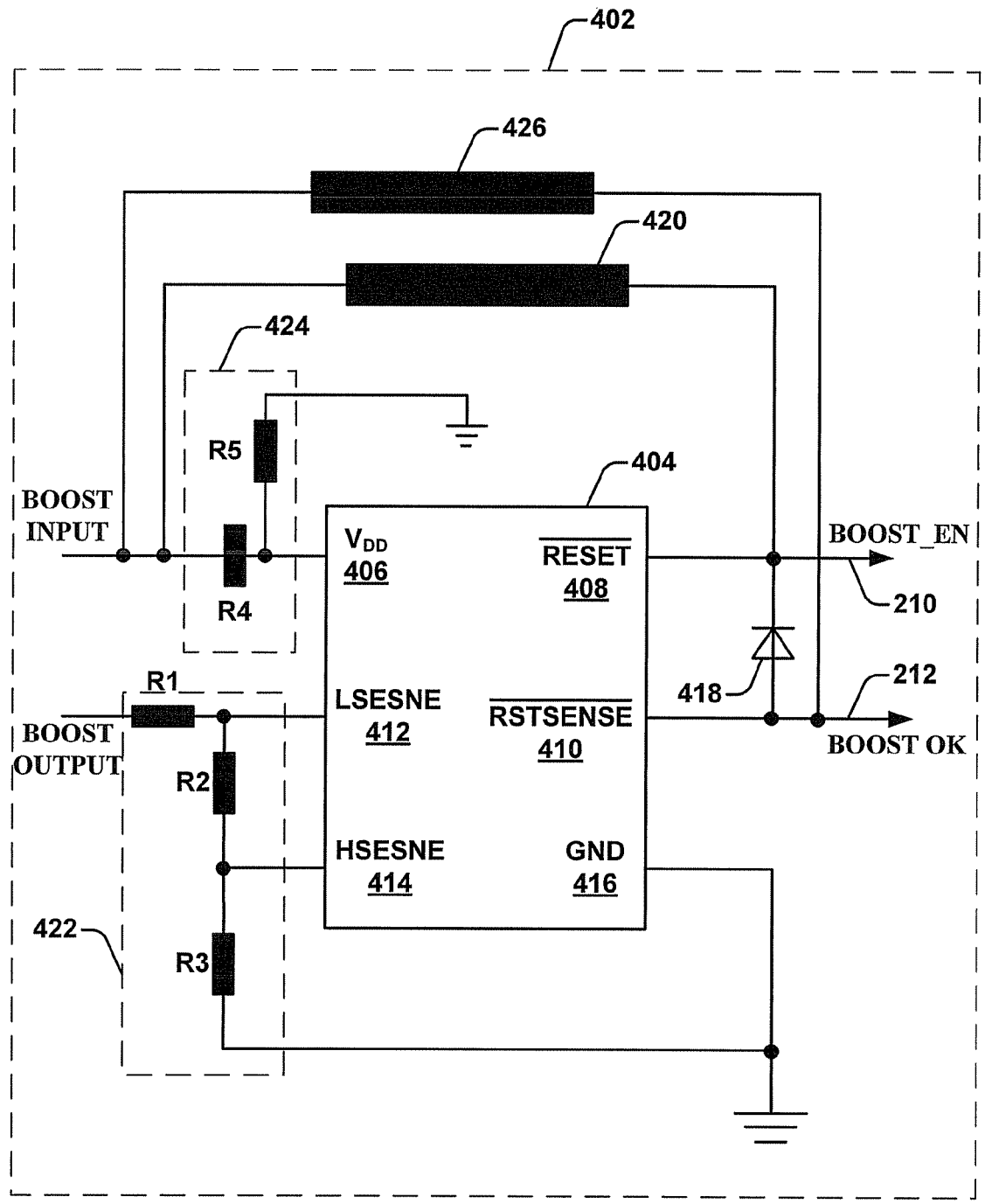
FIG. 4 illustrates an example boost control feedback component in accordance with aspects of various embodiments disclosed.

FIG. 4 illustrates an example of a boost control feedback component 402 in accordance with aspects of various embodiments disclosed. The control feedback component 402 obtains, acquires, or otherwise receives a boost input power. The boost input power can include the input power (e.g., 5V) from the input management component 202 (discussed in greater detail with reference to FIG. 2). The boost input power provides power to a power supply pin 406 (VDD 406) of a dual voltage detector 404.

During power-on of the dual voltage detector 404, a RESET pin 408 (RESET 408) of the dual voltage detector 404 is active or asserted when the VDD 406 is higher than a first predetermined threshold (e.g., VDD 406 higher than 3.0V or BOOST INPUT higher than 3.858V) and a RSTSENSE pin 410 (RSTSENSE 410) of the dual voltage detector 404 is active or asserted when the voltage at an HSENSE pin 414 (e.g., boost output or high voltage) exceeds a second predetermined threshold (e.g., HSENSE 414 higher than 1.207 V, or BOOST OUTPUT higher than 8.7V). During operation, the dual voltage detector 404 monitors the VDD 406 and the LSENSE 412, and maintains a BOOST_EN signal 210 (e.g., using the RESET 408) and a BOOST OK signal 212 (e.g., using the RSTSENSE 410) active when the VDD 406 (e.g., boost input) and the LSENSE 412 (e.g., boost output) exceeds a threshold voltage (VIT). If the voltage at VDD 406 is less than the VIT, then the dual voltage detector 404 deasserts, maintains as, or makes inactive the reset 408. If the voltage at LSENSE 412 is less than the VIT, then the dual voltage detector 404 deasserts, maintains as, or makes inactive the RSTSENSE 410.

A diode 418 clamps the BOOST OK signal 212 (e.g., output from the RSTSENSE 410) to the BOOST_EN 210 signal, and prevents current from the BOOST_EN signal 210 from flowing to the BOOST OK signal 212. Therefore, as long as the voltage of the boost input at the VDD 406 is less than the VIT, then BOOST OK 212 and the BOOST_EN 210 will remain inactive. In addition, a resistor 420 couples the boost input to the BOOST_EN 210 to provide a pull up power of the open drain type output RESET 408, and a resistor 426 couples the boost input to the BOOST_OK 212 to provide a pull up power for the open drain type output RSTSENSE 410. A set of resistors (R1, R2 and R3) form a voltage divider 422 that creates a hysteresis detection threshold at HSENSE and LSENSE, and asserts RSTSENSE 410 when the BOOST OUTPUT exceeds a third predetermined threshold (e.g., 8.7V), and deasserts RSTSENSE 410 when the BOOST OUTPUT is less than a fourth predetermined threshold (e.g., 8.499V). A pair of resistors (R4 and R5) form a voltage divider 424 that reduces the voltage of the boost input at the VDD 406 as a function of the values of R4 and R5. In one example configuration, the control feedback component 402

(e.g., voltage sensing component 304) can be included in the charge management component 106 and/or the boost component 204. For instance, the control feedback component 402 can be implemented using an integrated circuit (IC), such as a Texas Instrument™ TPS3806I33 dual voltage detector with adjustable hysteresis.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein.

Figure 5:
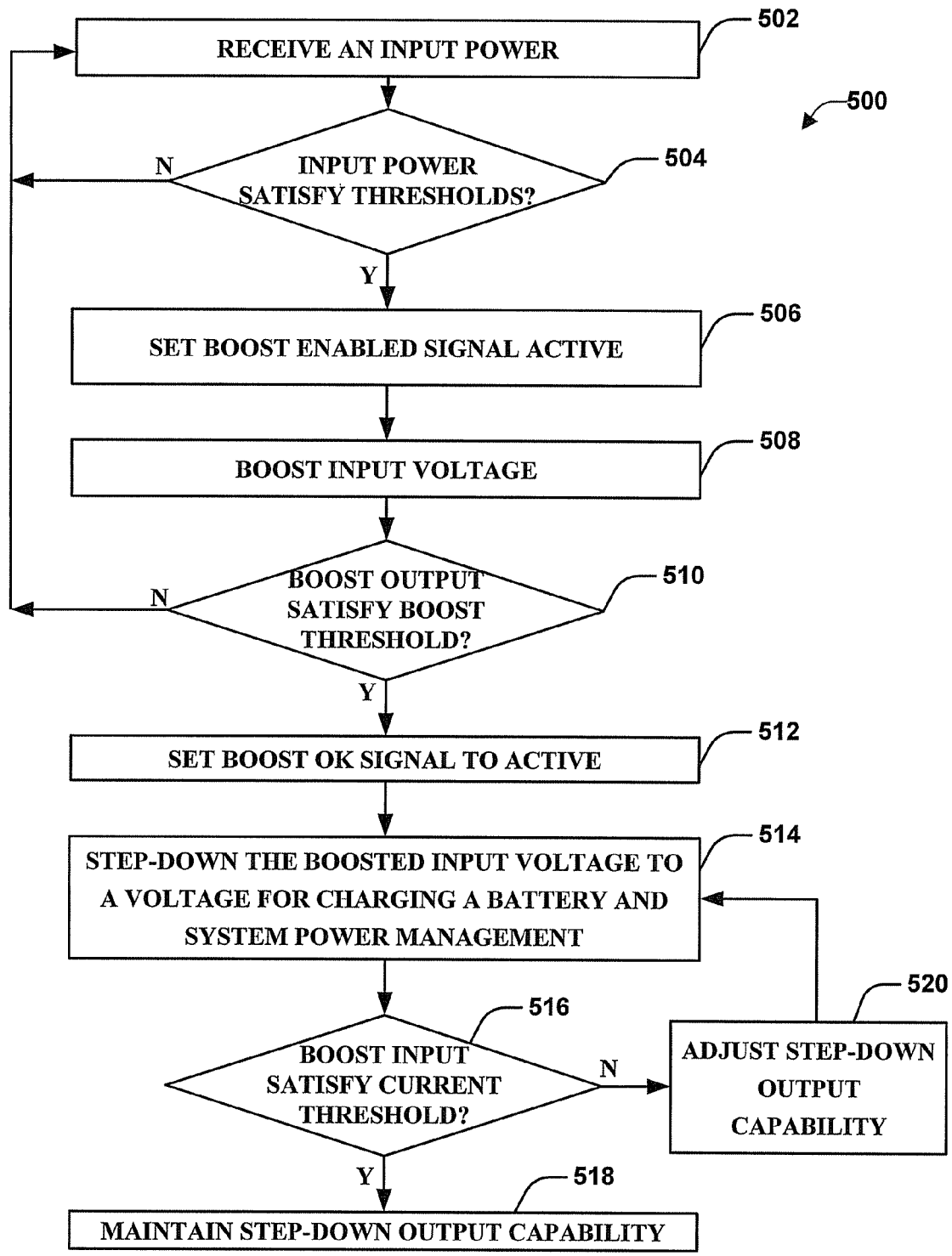
FIG. 5 illustrates an example of a flow diagram showing an example of a non-limiting embodiment for a boost charge solution with direct input sensing in accordance with aspects of various embodiments disclosed.

An example methodology 500 for a boost charge solution with direct input sensing is illustrated in FIG. 5. At 502, an input power is received. For example, in one configuration, about five volts (5V) direct current (DC) is received via a universal serial bus (USB). At 504, a determination is made whether the input power satisfies an input current threshold and/or input voltage threshold. For example, in one configuration, a determination is made whether the input voltage is greater than a predetermined upper limit. At 506, if it is determined that the input voltage satisfies the input voltage threshold (Y at 504), then a boost enabled (e.g., BOOST_EN or INPUT OK 210) signal is set to active (e.g., high, 1, true, etc.). Returning to 504, if it is determined that the input voltage does not satisfy the input voltage threshold (N at 504), then the boost enabled signal is set to (or remains) inactive (e.g., low, 0, false, etc.).

At 508, the input voltage is boosted. For example, in one implementation, the input voltage is boosted using a switching-mode power supply (SMPS). At 510, a determination is made whether the boost output voltage satisfies a boost voltage threshold. For example, in one configuration, a determination is made whether the boost output voltage is less than a predetermined upper limit. At 512, if it is determined that the boost output voltage satisfies the boost threshold (Y at 510), then a boost ok (e.g., BOOST OK 212) signal is set to active (e.g., high, 1, true, etc.). Returning to 510, if it is determined that the boost output voltage does not satisfy the boost threshold (N at 510), then the boost ok signal is set to (or remains) inactive (e.g., low, 0, false, etc.).

At 514, the boost output voltage is stepped-down to a voltage for charging for a battery and system power management. For example, in one configuration, the boost output voltage is stepped-down using a buck converter (e.g., SMPS) that converts the high voltage boost output to a lower voltage required for charging a battery. In one configuration, the battery (e.g., battery 110) can include but is not limited to a rechargeable lithium-ion (Li-ion) battery having two cells in series (2S) or three cells in series (3S). The voltage required to charge a 2S/3S Li-ion battery 110 can be from about 10V to about 24V, and the highest current appropriate for charging a Li-ion battery is about 25% of the total capacity of the battery in amp hours.

At 516, a determination is made whether the boost input current satisfies a boost input current threshold. At 518, if it is determined that the boost input current does satisfy the boost input current threshold (Y at 516), then a present step-down output level or capability is maintained. At 520, if it is determined that the boost input current does not satisfy the boost input current threshold (N at 516), then the step-down output capability is adjusted. For example, in one configuration, if the boost input current is below a boost input current lower limit, then the step-down output capability can be increased.

Many variations and modifications can be made to the above-described examples. All such modifications and variations are intended to be included herein within the scope of the disclosure and protected by the following claims. It will be noted that the singular forms "a," "an," and "the" include plural references unless the context clearly indicates otherwise.

What is claimed is:

1. An electronics system, comprising:
an input power management component to receive an input power, determine whether an input voltage of the input power is greater than an input voltage threshold, and in response to a determination that the input voltage is greater than the input voltage threshold, activate a boost enabled signal;
a boost component to receive the input power and the boost enabled signal from the input power management component, determine whether the boost enabled signal is activated, in response to a determination that the boost enabled signal is activated, generate a boost output voltage using the input voltage, compare the boost output voltage to a boost threshold, and if the boost output voltage is greater than the boost threshold, activate a boost OK signal; and
a step-down charging component to receive the boost output voltage and the boost OK signal from the boost component, determine whether the boost OK signal is activated, and in response to a determination that the boost OK signal is activated, decrease the boost output voltage to an output for charging a battery.

2. The electronics system of claim 1, wherein the input power management component determines an input current is less than an input current threshold, and in response to a determination that the input current is less than the input current threshold, instructs the step-down charge component to increase an output capability based on a status of the input current.

3. The electronics system of claim 1, wherein the input power management component receives the input voltage via a universal serial bus.

4. The electronics system of claim 1, wherein the battery is a lithium-ion battery.

5. The electronics system of claim 4, wherein the lithium-ion battery includes at least one of two cells in series or three cells in series.

6. The electronics system of claim 1, further comprising a boost control feedback component that controls generation of the boost output voltage by the boost component based at least in part on feedback regarding the boost output voltage.

7. The electronics system of claim 1, wherein
the input power management component determines whether the input voltage is less than the input voltage threshold; and
in response to a determination that the input voltage is less than the input threshold, the boost component does not generate a boost output voltage using the input voltage.

8. The electronics system of claim 1, wherein at least one of the input power management component, the boost component, or the step-down charging component is included in a computing device.

9. The electronics system of claim 1, wherein the input power management component and step-down charging component are included in a first integrated circuit.

10. A method, comprising:
receiving an input power;
detecting an input voltage;
determining that the input voltage satisfies a first predetermined threshold;

in response to the input voltage satisfying the first predetermined threshold, boosting the input power to generate a high voltage output;

comparing the high voltage output to a boost threshold, and if the high voltage output is greater than the boost threshold, activating a boost OK signal; and in response to determining the boost OK signal is activated, stepping down the high voltage output to a charging output.

11. The method of claim 10, further comprising:
determining an input current is less than a lower limit; and
in response to the input current being less than the lower limit, increasing the charging output.

12. The method of claim 10, wherein the receiving the input power includes receiving the input power from a universal serial bus.

13. The method of claim 10, wherein the stepping down the high voltage output to the charging output, includes stepping down the high voltage output to a charging output for a lithium-ion battery.

14. The method of claim 10, wherein the stepping down the high voltage output to a charging voltage for the lithium-ion battery, includes stepping down the high voltage output to a charging output for a lithium-ion battery having at least one of two cells in series or three cells in series.

15. The method of claim 10, further comprising controlling the boosting the input power based at least in part on feedback regarding the high voltage output.

\* \* \* \* \*